Jan. 10, 1933.  J. O. FRENCH  1,893,988
LEVEL
Filed Aug. 25, 1930   2 Sheets-Sheet 1

Inventor
James O. French
By *Clarence A O'Brien*
Attorney

Jan. 10, 1933. J. O. FRENCH 1,893,988
LEVEL
Filed Aug. 25, 1930 2 Sheets-Sheet 2

Inventor
James O. French

By *Clarence A. O'Brien*
Attorney

Patented Jan. 10, 1933

1,893,988

UNITED STATES PATENT OFFICE

JAMES O. FRENCH, OF LOS ANGELES, CALIFORNIA

LEVEL

Application filed August 25, 1930. Serial No. 477,705.

This invention appertains to new and useful improvements in levels and more particularly to the liquid bubble type.

The principal object of this invention is to provide a level device capable of being employed on many different kinds of instruments, in aviation and in various other capacities.

During the course of the following specification and claim, other important objects and advantages of the invention will readily become apparent to the reader.

In the drawings:—

Figure 1:
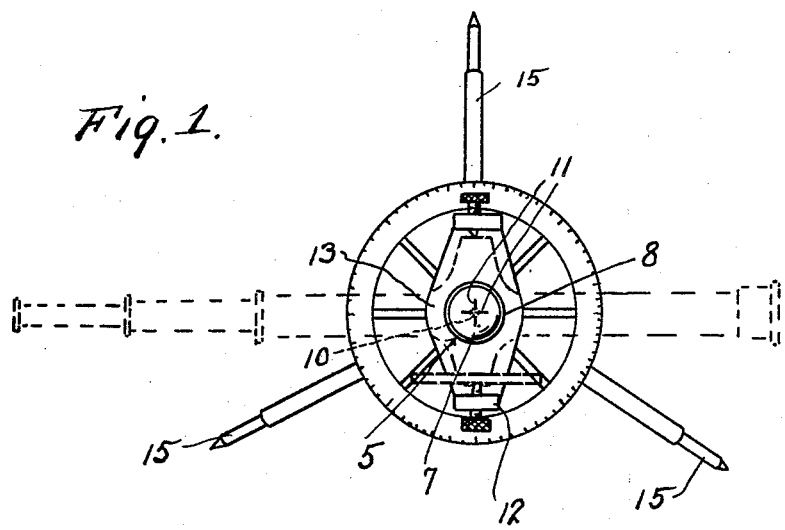
Figure 1 represents a top plan view of the device employed on a surveying instrument.

Referring to the drawings wherein like numerals designate like parts, it can be seen that the invention includes a bulb generally referred to by numeral 5, the same being constructed to provide a flat base side 6 and an overlying convex top side 7, the peripheries of which are merged together in the manner shown, so that the bulb will be more in the nature of a wafer.

Figure 4:
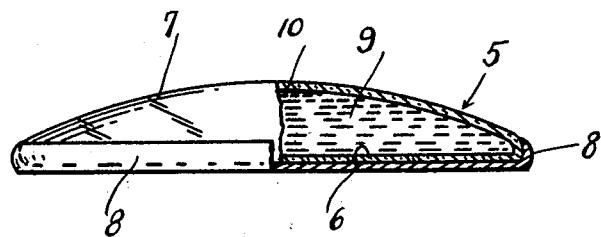
Fig. 4 represents a fragmentary side elevational view of the device.

The wafer is held in a cup-shaped member 8 having a flat bottom on which the bottom of the wafer rests and a peripheral flange which is bent over the peripheral part of the wafer, as shown in Figure 4 to hold the wafer in the member. This member 8 can be attached in any suitable manner to the part or instrument which is to carry the wafer.

A suitable liquid 9 is placed in the bulb so that when the bulb is in a level position the bubble 10 will be intersected by the right angularly intersecting groove 11 on the top of the convex side 11. The intersecting grooves 11 represent the stationary indicating means whereby the relative inclination of an object can be ascertained.

Figure 2:
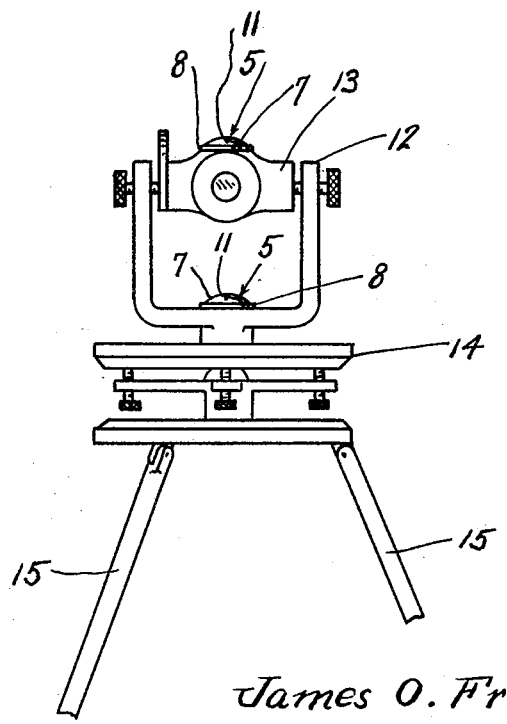
Fig. 2 represents a side elevational view of the device employed on a surveying instrument.
Figure 3:
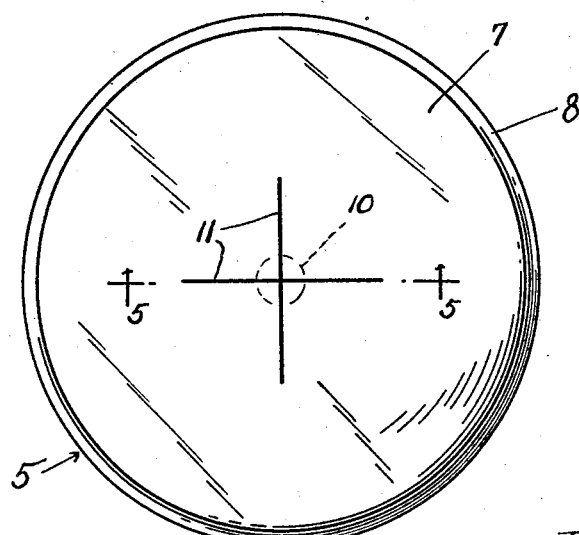
Fig. 3 represents a top plan view of the device alone.
Figure 5:
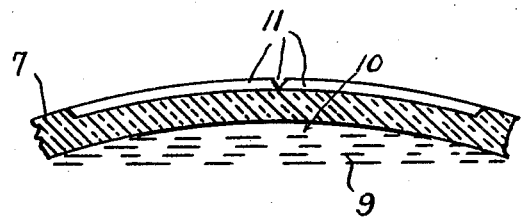
Fig. 5 represents a fragmentary sectional view taken substantially on the line 5—5 of Fig. 3.

In Figs. 1 and 2, a surveying instrument is generally referred to by numeral 12, the same including the instrument proper denoted by numeral 13, the swingable support 14 and the tripod 15. The level bulb can be placed in any one of several positions as shown in Fig. 2.

While the foregoing specification sets forth the invention in specific terms, it is to be understood that numerous changes in the shape, size and materials of the same may be resorted to without departing from the spirit and scope of the invention as claimed hereinafter.

Having thus described my invention, what I claim as new is:—

A level of the class described comprising a shallow hollow wafer formed of transparent material having its lower face flat and its upper face convexed, a cup-shaped member on the bottom of which the bottom part of the wafer rests and the flange of which is bent over the periphery of the wafer to hold the wafer in said member, said wafer having a liquid therein but partly filling the same to form a bubble and the central part of the convex face of the wafer having a pair of grooves therein intersecting each other and arranged at right angles to each other.

In testimony whereof I affix my signature.

JAMES O. FRENCH.